United States Patent Office 3,321,412
Patented May 23, 1967

3,321,412
POLYMERIZATION OF ALKYLENE OXIDES IN THE PRESENCE OF ALUMINOSILICATE CATALYSTS
Paul A. Naro, Woodbury, N.J., assignor to Mobil Oil Corporation, a corporation of New York
No Drawing. Filed Mar. 29, 1963, Ser. No. 269,163
18 Claims. (Cl. 260—2)

This invention relates to the polymerization of alkylene oxides in the presence of aluminosilicates having unique catalytic activity; in particular, the polymerization of ethylene oxide, propylene oxide, and the like in the presence of these aluminosilicate catalysts.

This invention contemplates polymerization of alkylene oxides in the presence of a catalyst prepared from synthetic and naturally occurring aluminosilicates having active cation sites within their ordered internal structures, the pore size of which is at least 6 A. and generally extends from about 6 A. to about 15 A. in diameter. These active cation sites are produced by the presence of metal and/or hydrogen cations ionically bonded or chemisorbed within the ordered internal structure of the aluminosilicate catalyst.

In addition, this invention covers the production of a wide range of alkylene oxide polymers in the presence of the heretofore-mentioned aluminosilicate catalysts by effecting polymerization of an alkylene oxide with a promoting agent, such as water, or the like, under certain reaction conditions. Furthermore, this invention contemplates production of alkylene oxide polymers by mass polymerization, or in the presence of liquid inert non-aqueous diluent solvent or non-solvent medium. In general, the alkylene oxide polymers produced in accordance with the process of this invention may be liquid, waxy, semi-solid or solid crystalline materials having molecular weights of from about 10,000 to about 200,000.

In accordance with this invention, it has been found that alkylene oxides may be polymerized by batch operation in either a liquid or a mixed vapor-liquid phase at temperatures from about room temperature to about 200° C. in the presence of an aluminosilicate catalyst having metal and/or hydrogen cations within its ordered internal structure. These cations may be present within the aluminosilicate as the result of conventional base exchanging of either naturally occurring or synthetic aluminosilicates, incorporating the cations during the formation of a synthetic aluminosilicate or being the exchangeable cations which are an integral portion of a naturally occurring aluminosilicate zeolite.

It will be appreciated that the unique activity of the catalysts for effecting polymerization of alkylene oxides is dependent on the nature and extent to which these active cation sites are found within the ordered internal structure of the aluminosilicate, as well as the availability of the sites for contact with the polymerizable reactants.

In general, the aluminosilicate catalysts having a high concentration of acid sites, i.e. hydrogen cations, uniformly ionically bonded or chemisorbed within their ordered internal structure are particularly effective in promoting polymerization of alkylene oxides to form higher molecular weight, solid polymers.

Advantageously, a high concentration of acid sites (H+) may be produced by exchanging an aluminosilicate zeolite with certain metal or hydrogen cations, or a combination of the two, so that either a portion of or substantially all of the exchangeable metal cations usually found within its ordered internal structure, e.g., alkali metals and alkaline earth metals, are replaced by the exchanging cations. It will be appreciated that the concentration of acid sites proportionally increases to the extent to which the exchangeable metal cations have been replaced.

Some aluminosilicates, however, are not stable to direct exchange with hydrogen cations or are not thermally stable after a portion of their exchangeable cations have been replaced with hydrogen cations. Thus, it is often necessary to exchange certain metal cations with an aluminosilicate to achieve the necessary acid stability within its ordered internal structure prior to the inclusion of hydrogen cations. In effecting such stability, it has been found that certain polyvalent metal cations not only provide acid stability to the aluminosilicates but also increase the concentration of acid sites without subsequent addition of hydrogen cations. Thus, the presence of certain metals, especially polyvalent metal cations having higher valences, within the aluminosilicates causes the formation of acid sites within their ordered internal structure. It is believed that these metals, particularly those which have valences of three or more, produce acid sites within the aluminosilicate because of the spatial arrangement of the $AlO_4$ and $SiO_4$ tetrahedra which make up the ordered internal structure of the aluminosilicates. Within certain aluminosilicates, where nearly every other tetrahedron has an exchangeable cation site (usually an alkali metal or alkaline earth metal), a polyvalent cation (two valent and even some three valent cations) may be accommodated within chemical bond distance by two or three, respectively, neighboring cation sites. However, if this accommodation is not spatially feasible, it is believed that the polyvalent metal cation is hydrolyzed thereby reducing its valence by the addition of one (or more, depending on its valence) hydroxy groups (OH)− and creating (from water molecules present in the aluminosilicate structure) a hydrogen cation (for each [OH]− group) which then occupies one of the sites vacated by the exchangeable cation. Thus, those metals having higher valences generally provide a higher concentration of acid sites. It will be appreciated that the formation of acid sites within an aluminosilicate may occur by base exchanging these metal cations within an existing aluminosilicate or during the formation of a synthetic aluminosilicate in an ionizable medium. In addition, it will also be appreciated that the degree to which an aluminosilicate has been base exchanged with these metals will also determine the concentration of acid sites. Furthermore, it will be appreciated that the concentration of acid sites may be increased by the subsequent exchange with hydrogen cations or cations converted to the hydrogen cation, e.g., the ammonium radical.

In accordance with this invention, lower molecular weight polymers, i.e. those which are liquid or semi-solid waxes, may also be produced in the presence of these highly acid aluminosilicate catalysts by altering the operating conditions of the process in a manner to be later described. In addition, the concentration of acid sites within the aluminosilicate catalyst may be reduced so as to provide a lower activity level within the catalyst for promoting the production of lower molecular polymers. These low acid aluminosilicate catalysts may be produced directly from naturally occurring or synthetic aluminosilicate zeolites containing cations of metals having lower valences such as alkali metals and the alkaline earth metals.

The unique activity of the aluminosilicate catalyst for effecting polymerization is also dependent on the availability of the active cation sites. Accordingly, the defined pore size of an aluminosilicate is to be considered when preparing the catalyst of this invention. Generally, the aluminosilicate should have a pore size at least about 6 A. in diameter so that it can accept the cyclic or alicyclic alkylene oxide compounds within its ordered internal structure. Preferably, in order to accommodate the alkylene oxides which produce the larger molecular weight, solid polymers, the pore size is from about 10 A. to about 13 A. in diameter. It will be appreciated that the pore size required for a particular catalyst will depend on the alkylene oxide monomer to be polymerized as well as the final polymerization product being produced.

The process of this invention is effective for the polymerization of several lower molecular weight alkylene oxides, i.e. those having from 2 to 8 carbon atoms per molecule. Typical of such oxide compounds are ethylene oxide, propylene oxide, isobutylene oxide and the like. In addition, halogenated derivatives of these alkylene oxides, e.g. chloropropylene oxide, may be effectively polymerized by this process.

It will also be appreciated that other compounds also containing an oxygen bridge and broadly referred to as epoxy compounds may be copolymerized with the alkylene oxides in the manner similar to that heretofore described for the polymerization of the alkylene oxide monomer. These other epoxy-hydrocarbons, such as 1,2-epoxybutane, 2,3-epoxybutane, cyclohexene oxide, and the like, may be copolymerized with the alkylene oxides by simply admixing them with the alkylene oxides during the polymerization reaction.

It will be appreciated further that these and other epoxy compounds, i.e. those containing more than 8 carbon atoms and an oxygen bridge, may also be polymerized in the presence of the alumino-silicate catalyst contemplated by this invention. However, only those compounds having a configuration the diameter of which is small enough to pass into the pores of the ordered internal structure of the catalysts are suitable. In addition, the polymers formed from such epoxy compounds should have linear configuration which can pass out of the pores of the catalyst.

Typical of the aluminosilicates employed in accordance with this invention, are several aluminosilicates, both natural and synthetic, which have a defined pore size of from 6 A. to 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline aluminosilicates utilized by the present invention is the synthetic zeolite designated as zeolite X, and is represented in terms of mole ratios of oxides as follows:

$$1.0\pm0.2M_{2/n}O:Al_2O_3:2.5\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms; the former being preferred for the purposes of this invention. It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic zeolite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another aluminosilicate material found to be active in the present process is a naturally occurring zeolite known as mordenite. This zeolite has an ordered crystalline structure having a ratio of silicon atoms to aluminum atoms of about 5 to 1. In its natural state it usually appears as the sodium salt which is represented by the following formula:

$$Na_8(AlO_2)_8(SiO_2)_{40}24H_2O$$

Mordenite differs from other known zeolites in that its ordered crystalline structure is made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameters. As a result of this different crystalline framework, mordenite can adsorb simple cyclic hydrocarbons, but cannot accept the large molecules which will be adsorbed by zeolite X and zeolite Y. As a consequence of this smaller pore size, it has been found that mordenite will be more rapidly deactivated than either zeolite X or zeolite Y at the operating conditions of the present process.

It will be appreciated that other aluminosilicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the aluminosilicate advantageously should have ordered internal structure capable of chemisorbing or ionically bonding additional metals and/or hydrogen ions within its pore structure so that its catalytic activity may be altered for a particular reaction. Among the naturally occurring crystalline aluminosilicates which can be employed are faujasite, heulandite, clinoptilolite, chabazite, gmelinite, mordenite and dachiardite. These silicates have been found to have the ability to adsorb hydrocarbons containing more than three carbon atoms within their internal structure.

One of the preferred aluminosilicate catalysts for the process of this invention is prepared from the sodium form of zeolite X, having a pore size of 13 A. This aluminosilicate is a commercially available synthetic zeolite designated as "Linde 13X." Another aluminosilicate catalyst which is effective for polymerization of alkylene oxides, especially to form solid polymers is prepared from "Linde 13X" as a result of a conventional treatment (base exchanging) involving partial replacement of the sodium by contact with a fluid medium containing cations of at least one of the rare earth metals. Any medium which will ionize the cations without affecting the crystalline structure of the zeolite may be employed. After such treatment, the resulting exchanged zeolite product is water washed, dried, and dehydrated. The dehydration thereby produces the characteristic system of open pores, passages, or cavities of the crystalline aluminosilicates.

As a result of the aforementioned treatment, the rare earth exchanged aluminosilicate is an activated crystalline catalyst in which the nucleus structure has been charged by having metallic rare earth cations and hydrogen cations chemisorbed or ionically bonded thereto. It will be understood that the hydrogen cations in rare earth exchanged catalyst result from the hydrolysis of the rare earth cations in the manner heretofore described.

Advantageously, the rare earth cations can be provided from the salt of a single metal or preferable mixture of metals such as rare earth chlorides or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

It will be appreciated that the rare earth exchanged zeolite X may be further treated to increase its concentration of acid sites by base exchanging the exchanged zeolite with hydrogen cations or cations such as the ammonium radical.

Other effective catalysts for the present polymerization process can be prepared from aluminosilicates such as zeolite Y and mordenite. Advantageously, the sodium form of zeolite Y alone may be employed as catalytic material. Also, exchange of rare earth metals for the sodium cations within zeolite Y produces a highly active catalyst in a manner similar to that described for preparation of the rare earth exchanged zeolite X. In addition, because of its high acid stability, zeolite Y may also be treated by partially replacing the sodium cations with hydrogen cations. This replacement may be accomplished by treatment with a fluid medium containing a hydrogen cation or a cation capable of conversion to a hydrogen ion. Inorganic acids represent the source of hydrogen cations, whereas ammonium compounds are representative of the cations capable of conversion to hydrogen cations. It will be appreciated that the fluid medium may contain a hydrogen cation, an ammonium cation, or a mixture thereof in a pH range from about 1 to about 12.

Mordenite may be activated to serve as a catalyst for the instant invention by replacement of the sodium with a hydrogen cation. The necessary treatment is essentially the same as that described above for the preparation of acid zeolite Y. In general, the mordenite is reduced to a fine powder (approximately passing the 200 mesh sieve and preferably passing the 300 and 325 mesh sieves or finer) and then acid treated.

It will be appreciated that cations of other metals than the rare earths having mono- and poly-valences may be employed to replace the exchangeable cations from the aluminosilicates to provide a catalytic material for this alkylation process. Exemplary of some of the more effective metals are zinc, copper, magnesium, tin, cobalt, silver, and the like. Moreover, other higher valence metals such as titanium, vanadium, chromium, mangasese, and iron, and the like, may be employed. It will be understood that the chemical properties of the metals, i.e., atomic radius, degree of ionization, hydrolysis constant, and the like, will determine suitability for exchange with a particular aluminosilicate.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Ser. No. 147,722 filed Oct. 26, 1961, by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight means particle diameter of less than 40 microns and preferably less than 15 microns. Also, the aluminosilicate may be combined with and distributed throughout a gel matrix by dispersing the aluminosilicate in powdered form in an organic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II-A, III-B, and IV-A of the Periodic Table. Such components include for example, silica-alumina, silica-magnesia, silica-zirconia, silica-thoria, silica-beryllia, silica-titania, as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of 1/16" to 1/8" size for example obtained upon pelleting the aluminosilicate with a suitable binder such as clay. The zeolite X, described hereinabove, may be obtained on a clay-free basis or in the form of pellets in which clay is present as a binder.

In order to effect the polymerization of alkylene oxides in accordance with the process of this invention, the monomer and the catalyst may be mixed together and charged directly into a closed autoclave reactor and then heated until the polymerization has reached the desired completion. Ordinarily, the reaction mass is agitated during the polymerization reaction. Usually, the amount of catalyst required is small and extends from 1 to 15 percent by weight, based on the amount of the monomer being polymerized. Preferably, the catalyst is used in amounts from 4 to 10 percent by weight. It will be appreciated that the amount of catalyst is dependent on the particular catalyst employed, the operating conditions, and the polymer to be produced.

In addition, the polymerization may also be carried out in a suitable inert non-aqueous diluent medium made up of a solvent or non-solvent. Utilization of such diluent media during the polymerization may tend to reduce the rate of reaction, but in most instances, it facilitates a more complete polymerization of the monomer. Typical of the media having the desired solvent characteristics for this polymerization process are diethyl ether, diisopropyl ether, petroleum ether, benzene, n-hexane, and the like. Although various liquid non-solvent media may also be used, e.g., methyl ethyl ketone, ethyl acetate, and the like, solvent media are preferred.

Generally, the inert non-aqueous diluent medium will be used in quantities that are approximately equal to the quantity of the monomer being polymerized.

The process of this invention may be carried out over a wide range of operating conditions. The temperature may extend in the range of from about room temperature to 200° C. Preferably, the temperature is from 60° to 130° C. At the lower temperatures, the aluminosilicate catalyst having a high concentration of acid sites, such as the exchanged zeolite X, is particularly effective for producing high yields of the higher molecular weight, solid polymers. Reaction time at such temperatures generally extends from about 75 to 100 hours or more. At the higher temperatures, the rate of reaction is relatively rapid (3 to 40 hours) and accordingly the use of the aluminosilicate catalysts having a low concentration of acid sites for producing higher molecular weight solid polymers is desirable to provide greater control of the process. However, when liquid or semi-solid polymers are desired, the temperatures can be reduced so as to produce the desired polymer characteristics.

The polymerization rate may be increased by carrying out the process of this invention in the presence of a trace amount of a promoter such as water, and the like. For example, with a trace of water, the polymerization of propylene oxide with a rare earth exchanged catalyst may be effected in 3 to 10 hours at a temperature of 100° C., which reaction without water would require 40 or more hours. However, the presence of some promoters such as water, in greater than trace amounts, has a tendency to reduce the molecular weight of the polymer. Usually, the amount of promoter is not greater than about 0.5 weight percent of the catalyst, with about 0.1 to 0.35 weight percent of the catalyst being preferred.

This process may operate at pressures from atmospheric to several atmospheres. Preferably, the pressure is sufficient to maintain either the charged monomer or inert diluent media in a liquid phase. In general, it has been found that the process of this invention is effectively carried out at autogenous pressures.

It will be appreciated that the operating conditions employed by the present invention will be dependent on the specific polymerization reaction being effected. Such conditions as temperature, pressure, the amount of monomer and the presence of inert diluents and promoters will have important effects on the process. Accordingly, the manner in which these conditions affect not only the conversion and nature of the resulting polymer products but also the rate of deactivation of the catalyst will be described below.

The process of this invention and the results obtained thereby may be more readily understood by reference to the following examples which are illustrative of the reactants, operating conditions, and the catalyst employed herein.

The runs described in the following examples were conducted in conventional glass lined, double-walled autoclaves either having stirrers or being rotatably mounted for continuous or intermittent agitation of the reaction mass. Heat for the reactors was provided by passing a heated fluid between the double wall construction. In several runs, catalyst particles, 8-14 mesh, were suspended within the alkylene oxide prior to effecting the polymerization. In other runs, catalyst pellets were dispersed throughout the reaction mass with a non-aqueous diluent medium, stirring being effected by movement of the entire autoclave mechanism so as to avoid damage to the catalyst pellets.

*Example I*

A series of runs were made in which propylene oxide was polymerized in stirred, glass lined, steam heated autoclaves. The reactors were purged with nitrogen and then a specific amount of a catalyst prepared from rare earth exchanged zeolite X and 1000 grams of monomer were added. The reactor was then brought to a temperature of 100° C. and so maintained for 72 hours. At the end of selected intervals, each reactor was shut down and the reaction mass was heated so as to vaporize and drive off the unreacted monomer, which was collected. Then the polymer and the catalyst were separated by dissolving the polymer in benzene and centrifuging after which the benzene was vaporized from the polymer. Then the molecular weight of polymer was determined by measuring the reduced viscosity of 0.1 gm. in 100 ml. of benzene at 30° C. The following data show the results of these runs:

TABLE I.—POLYMERIZATION OF PROPYLENE OXIDE IN THE PRESENCE OF A RARE EARTH EXCHANGED ZEOLITE X CATALYST

|  | Run Number | | | |
|---|---|---|---|---|
|  | 1 | 2 | 3 | 4 |
| Conditions: | | | | |
| Temperature °C | 100 | 100 | 100 | 100 |
| Pressure, Autogenous in all Runs, p.s.i.g. | 95 | 95 | 95 | 95 |
| Reaction Time, hr | 72 | 72 | 72 | 72 |
| Catalyst (wt. percent) | 1 | 2 | 4 | 6 |
| Polymer Analysis: | | | | |
| Weight of Polymer, gm | 500 | 650 | 700 | 700 |
| Reduced Viscosity of Polymer at 30° C | 3.0 | 2.9 | 2.8 | 2.8 |
| Molecular Weight of Polymer ×10⁻⁵ | 2.6 | 2.5 | 2.4 | 2.4 |
| Percent Conversion of Monomer | 50 | 65 | 70 | 70 |

*Example II*

In order to illustrate the effects of a trace amount of promoter such as water on the polymerization reaction, several runs were conducted in which propylene oxide was polymerized using the same amount of catalyst and the same reactor used in run No. 2 of Example I, with a different amount of water used in each of the runs. As shown by the following data, the reaction time necessary for producing a given molecular weight of polymer is substantially reduced by the presence of a promoter such as water.

TABLE II.—POLYMERIZATION OF PROPYLENE OXIDE IN THE PRESENCE OF A RARE EARTH EXCHANGED ZEOLITE X CATALYST WITH TRACE AMOUNTS OF WATER

|  | Run Number | | | |
|---|---|---|---|---|
|  | 5 | 6 | 7 | 8 |
| Conditions: | | | | |
| Temperature, °C | 100 | 100 | 100 | 100 |
| Reaction Time, hr | 10 | 10 | 72 | 72 |
| Amount of Water Present, Percent | 0.1 | 0.3 | 0.5 | 1 |
| Polymer Analysis: | | | | |
| Weight of Polymer | 750 | 740 | 700 | 700 |
| Reduced Viscosity of Polymer* | 3.0 | 2.9 | 1.5 | 1.3 |
| Molecular Weight of Polymer ×10⁻⁵ | 2.6 | 2.5 | 1.1 | 0.9 |
| Percent Conversion of Monomer | 75 | 74 | 70 | 70 |

*0.1 gram of polymer in 100 ml. of benzene at 30° C.

*Example III*

The unique activity exhibited by a catalyst prepared from the sodium form of zeolite X for effecting polymerization of ethylene oxide is shown by this example. Ten grams of the catalyst were mixed with 1000 grams of ethylene oxide and charged into a stirred, steam heated autoclave. The temperature of the autoclave was then raised to 80° C. and held for one hour. Then a sample was taken and cooled which indicated that about 5 percent by weight of the ethylene oxide remained in the reaction mass. Rotation of the autoclave was then stopped and the temperature lowered to 50° C. to allow the ethylene oxide to vaporize from the reactor. The contents of the reactor were then cooled to room temperature and contacted with acetone to dissolve the polymer and separate the catalyst by decanting off the polymer solution.

TABLE III.—POLYMERIZATION OF ETHYLENE OXIDE IN THE PRESENCE OF A CATALYST PREPARED FROM THE SODIUM FORM OF ZEOLITE X

Conditions:
  Temperature, °C _____ 80
  Amount of catalyst, percent by wt. of monomer _____ 1.0
  Amount of promoter, alcohol, percent _____ 0.1
Polymer analysis:
  Weight of polymer, g. _____ 950
  Reduced viscosity of polymer * _____ 15

* 0.2 gm. of polymer in 100 ml. of water at 30° C.

*Example IV*

The polymerization of ethylene oxide in the presence of an acid activated, naturally occurring aluminosilicate such as mordenite is illustrated by this example. A charge containing 10 gm. of acid mordenite (8–14 mesh) and 1000 gm. of ethylene oxide were placed in a glass lined, steam heated autoclave. The autoclave was then raised to a temperature of 80° C. while being stirred. Autogenous pressure was maintained in the autoclave and the polymerization allowed to proceed for 10 hours. The autoclave was then cooled and opened to allow the unreacted monomer to vaporize from the polymerization mass. Subsequent separation and evaluation of the resulting waxy polymer showed a reduced viscosity of 12.

It will be appreciated that the foreging examples are merely illustrative of the variety of the monomers, aluminosilicate catalysts, promoters, and diluent mediums, which may be employed in the process of this invention and that other monomers and catalysts as enumerated in the specification may be effectively employed by this invention.

It will be further appreciated that the operating conditions for the polymerization reactions in accordance with the process of this invention, as exemplified in the foregoing examples and specification, may be varied so that polymers of differing physical properties can be produced depending on the monomers employed, degree and rate of polymerization, and diluents employed, and that various modifications and alterations may be made in the process of this invention without departing from the spirit of the invention.

What is claimed is:

1. A process for polymerizing alkylene oxides which comprises effecting polymerization of an alkylene oxide containing from 2 to 8 carbon atoms and having an oxygen bridge between immedately adjacent carbon atoms under reaction conditions in the presence of from 1 to 15 percent by weight of a catalyst, based on the weight of the alkylene oxide, said catalyst consisting essentially of a crystalline aluminosilicate having active cation sites within its ordered internal structure, said ordered internal structure having a defined pore size of at least 6 A.

2. The process of claim 1 in which said alkylene oxide is selected from the group consisting of ethylene oxide, propylene oxide, isobutylene oxide, and halogenated epoxide derivatives containing from 2 to 4 carbon atoms per molecule.

3. The process of claim 1 in which said catalyst has a high concentration of acid sites within its ordered internal structure.

4. The process of claim 1 in which the cations are hydrogen cations.

5. The process of claim 1 in which said cations are selected from the group consisting of the alkali metals and the alkaline earth metals.

6. The process of claim 1 in which said cations are of the rare earth metals.

7. The process of claim 1 in which said aluminosilicate catalyst is the sodium form of zeolite X which may be represented in terms of mole ratios of oxides by the formula:

$$0.9\ Na_2O:Al_2O_3:2.5\ SiO_2:6.1\ H_2O$$

8. The process of claim 1 in which said aluminosilicate catalyst is a rare earth exchanged zeolite X, the sodium form of which may be represented in terms of mole ratios of oxides by the formula:

$$0.9\ Na_2O:Al_2O_3:2.5\ SiO_2:6.1\ H_2O$$

9. The process of claim 1 in which said aluminosilicate catalyst is the sodium form of zeolite Y which may be represented in terms of mole ratios of oxides by the formula:

$$0.9\pm 0.2\ Na_2O:Al_2O_3:WSiO_2:XH_2O$$

wherein W is a value greater than 3 up to about 5 and X may be a value up to about 9.

10. The process of claim 1 in which said aluminosilicate catalyst is a rare earth exchanged zeolite Y, the sodium form of which may be represented in terms of mole ratios of oxides by the formula:

$$0.9\pm 0.2\ Na_2O:Al_2O_3:WSiO_2:XH_2O$$

wherein W is a value greater than 3 up to about 5 and X may be a value up to about 9.

11. The process of claim 1 in which the aluminosilicate catalyst is acid mordenite, the sodium form of which may be represented by the formula:

$$Na_8\ (AlO_2)_8\ (SiO_2)_{40}\ 24\ H_2O$$

12. The process of claim 1 in which the aluminosilicate is contained in and distributed throughout a matrix binder material.

13. The process of claim 1 in which said polymerization is effected at temperatures from about room temperature to about 200° C.

14. The process of claim 1 in which the reaction is conducted in the presence of an inert, non-aqueous diluent medium.

15. A process for producing solid, high molecular weight, polypropylene oxide which comprises mixing propylene oxide with from 1 to 15 percent by weight of a catalyst, based on the weight of said oxide, said catalyst consisting essentially of a rare earth exchanged zeolite X, the sodium form of which may be represented in terms of mole ratios of oxide by the formula:

$$0.9\ Na_2O:Al_2O_3:2.5\ SiO_2:6.1\ H_2O$$

at temperatures from about 60° to about 130° C. for a period sufficient to effect substantially complete polymerization, and separating the solid polymer from the resulting reaction mass.

16. The process of claim 13 in which a trace of water is added to the propylene oxide to increase the rate of polymerization.

17. A process for producing solid polyethylene oxide which comprises mixing ethylene oxide with from 1 to 15 percent by weight of a catalyst, based on the weight of said oxide, said catalyst consisting essentially of a sodium form of zeolite X, the sodium form of which may be represented in terms of mole ratios of oxides by the formula:

$$0.9\ Na_2O:Al_2O_3:2.5\ SiO_2:6.1\ H_2O$$

at a temperature from about 80° to about 200° C. for a period sufficient to effect substantially complete polymerization, and separating the solid polymer from the resulting reaction mass.

18. A process for producing a solid polymer from ethylene oxide which comprises mixing the ethylene oxide with from 1 to 15 percent by weight of a catalyst, based on the weight of said oxide, said catalyst consisting essentially of acid mordenite, the sodium form of which may be represented by the formula:

$$Na_8\ (AlO_2)\ (SiO_2)_{40}\ 24\ H_2O$$

at a temperature from about 60° to about 150° C. for a period sufficient to effect substantially complete polymerization, and separating the polymer from the reaction mass.

References Cited by the Examiner

UNITED STATES PATENTS

| | | | |
|---|---|---|---|
| 2,121,695 | 6/1938 | Hill | 260—2 |
| 2,149,498 | 3/1939 | Bludworth | 260—2 |
| 2,187,006 | 1/1940 | Alvarado et al. | 260—2 |
| 3,018,264 | 1/1962 | Colclough | 260—2 |
| 3,036,983 | 5/1962 | O'Connor | 260—2 |

FOREIGN PATENTS 1,045,662  12/1958  Germany.

OTHER REFERENCES

Hackh: "Chemical Dictionary," 3rd edition, McGraw Hill, New York, page 549 (QD5H3 1944).

WILLIAM H. SHORT, *Primary Examiner.*

S. N. RICE, T. E. PERTILLA, *Assistant Examiners.*